United States Patent [19]

Foos et al.

[11] Patent Number: 5,344,624

[45] Date of Patent: Sep. 6, 1994

[54] METHOD FOR RECOVERING WITH THE AID OF A CROWN COMPOUND PLUTONIUM (IV) PRESENT IN SOLUTIONS, SUCH AS AQUEOUS EFFLUENTS, CONCENTRATED SOLUTIONS OF FISSION PRODUCTS AND CONCENTRATED SOLUTIONS OF PLUTONIUM

[75] Inventors: Jacques Foos, Orsay; Marc Lemaire, Villeurbanne; Alain Guy, Pontcarre; Vincent Guyon, Paris; Rodolphe Chomel, Orange; André Delo Ge, Bagnols/Ceze; Pierre Doutreluigne, Bagnols/Ceze; Henri Le Roy, Equeurdreville, all of France

[73] Assignee: Cogema-Compagnie Generale des Matieres Nucleaires, France

[21] Appl. No.: 935,038

[22] Filed: Aug. 25, 1992

Related U.S. Application Data

[62] Division of Ser. No. 625,550, Dec. 11, 1990, Pat. No. 5,183,645.

[30] Foreign Application Priority Data

Dec. 15, 1989 [FR] France .................. 89 16639

[51] Int. Cl.$^5$ ............... C22B 60/04; B01D 11/00
[52] U.S. Cl. ............................. 423/6; 423/8
[58] Field of Search ........... 423/6, 7, 8, 251, 253; 252/626, 627

[56] References Cited

U.S. PATENT DOCUMENTS

| | | | |
|---|---|---|---|
| 4,254,034 | 3/1981 | van Zon | 260/338 |
| 4,421,923 | 12/1983 | Bartsch | 549/349 |
| 4,438,251 | 3/1984 | Herweh | 528/73 |
| 4,519,996 | 5/1985 | Knochel et al. | 423/249 |
| 4,683,124 | 7/1987 | Muscatello et al. | 423/6 |
| 4,749,518 | 6/1988 | Davis, Jr. et al. | 252/627 |
| 4,917,825 | 4/1990 | McDowell et al. | 252/631 |
| 5,028,402 | 7/1991 | Foos et al. | 423/8 |
| 5,179,213 | 1/1993 | Bradshaw | 549/3 |

FOREIGN PATENT DOCUMENTS 0073261 of 0000 European Pat. Off. .
2633090 12/1989 France .

OTHER PUBLICATIONS

Chemical Abstracts, vol. 105, 1986, p. 504, Abstract 198772f.
Chemical Abstracts, vol. 104, 1986, p. 592, Abstract 9 7609g.
Chemical Abstracts, vol. 97, 1982, p. 398, Abstract 61870h.

Primary Examiner—Donald P. Walsh
Assistant Examiner—Ngoclan T. Mai
Attorney, Agent, or Firm—Pearne, Gordon, McCoy & Granger

[57] ABSTRACT

The invention concerns the recovery of Pu (IV) by using crown compounds.

According to the invention, the aqueous solution containing the plutonium (IV) is placed in contact with at least one crown compound, for example DCH 18C6, dissolved in an organic diluting agent, such as benzonitrile. In the case where the solution only contains traces of Pu, it is possible to use a crown compound secured to a solid phase, such as silica.

The aqueous solution is a concentrated solution of fission products, an effluent originating from an irradiated nuclear fuel reprocessing installation or a concentrated solution of plutonium with americium.

10 Claims, 1 Drawing Sheet

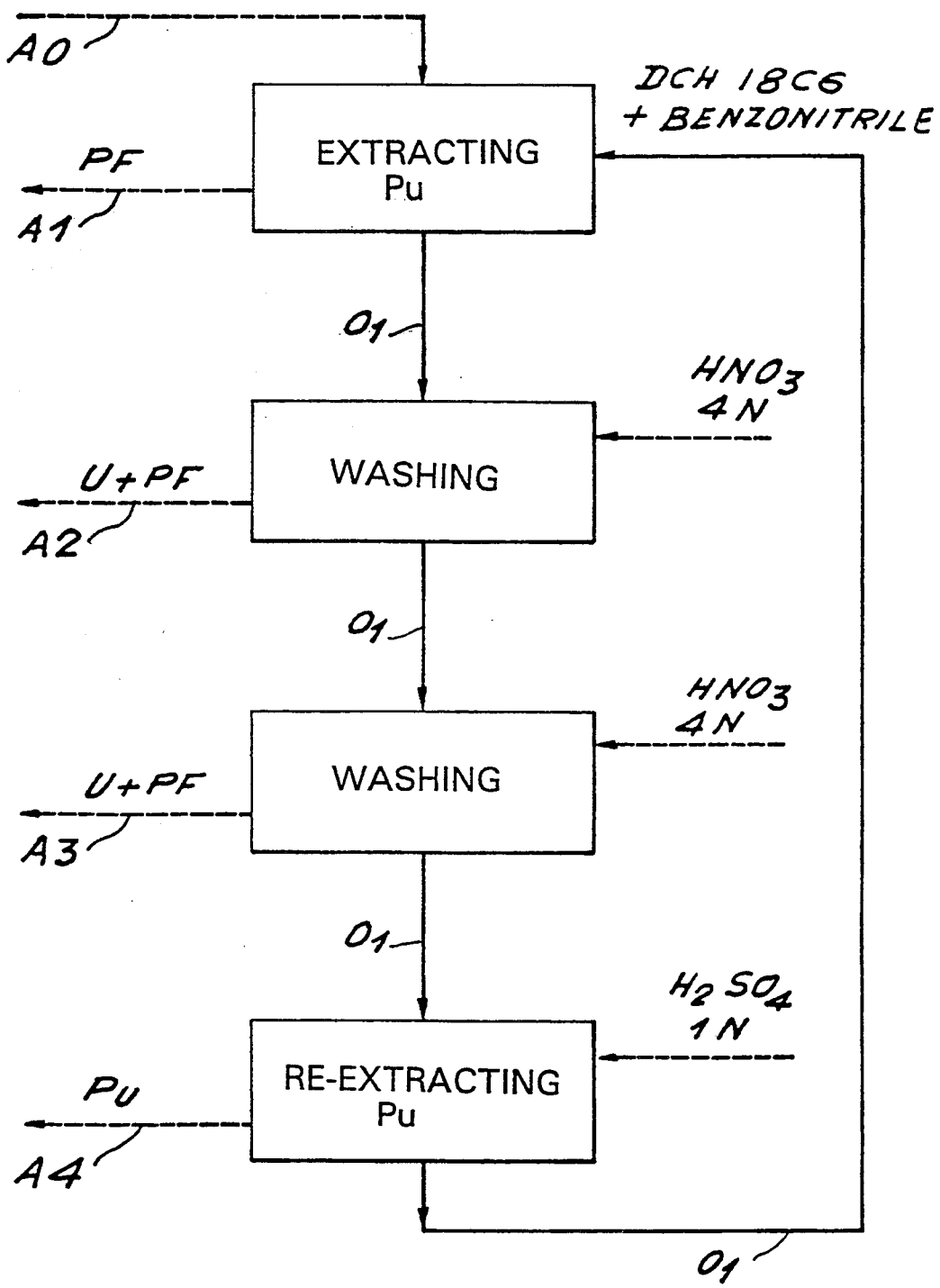

METHOD FOR RECOVERING WITH THE AID OF A CROWN COMPOUND PLUTONIUM (IV) PRESENT IN SOLUTIONS, SUCH AS AQUEOUS EFFLUENTS, CONCENTRATED SOLUTIONS OF FISSION PRODUCTS AND CONCENTRATED SOLUTIONS OF PLUTONIUM

This is a division of application Ser. No. 07/625,550, filed Dec. 11, 1990 U.S. Pat. No. 5,183,645.

FIELD OF THE INVENTION

The present invention concerns a method to recover plutonium (IV) present in aqueous solutions.

BACKGROUND OF THE INVENTION

More specifically, the invention concerns a method using at least one crown compound, either to recover the final traces of plutonium in aqueous solutions polluted by salts of this metal, for example concentrated solutions of fission products derived from the reprocessing of irradiated fuels and the effluents from reprocessing installations, or to separate the plutonium from americium from concentrated solutions of plutonium.

For several years, the most widely used technique to reprocess irradiated nuclear fuels consists of dissolving the fuel in a nitric solution and of then placing the nitric solution obtained in contact with an organic solvent so as to extract from the latter the uranium and the plutonium and to separate them from most of the fission products which remain in the aqueous solution; this aqueous solution corresponds to a concentrated fission product solution, but it generally contains traces of plutonium which need to be recovered. Similarly, at the end of processing, aqueous effluents are also recovered containing traces of plutonium which need to be recovered.

Currently known methods to carry out this type of processing result in obtaining satisfactory results, but it is still advantageous to further improve the plutonium decontamination percentage of all these solutions.

Another problem concerning the decontamination and purification of plutonium exists in the case of concentrated plutonium solutions which, when ageing, are found to be contaminated by plutonium offspring, such as americium, which need to be separated.

SUMMARY OF THE INVENTION

The object of the present invention is to provide a method to recover plutonium present in an aqueous solution, this method also making it possible to recover the final traces of plutonium in highly diluted solutions and to separate the plutonium from americium from concentrated solutions.

According to the invention, these results are obtained by using a crown compound as a plutonium extractor.

According to the invention, the method for recovering plutonium (IV) present in an aqueous solution, constituted by either a concentrated fission products solution originating from the first cycle for reprocessing irradiated nuclear fuels or by an aqueous effluent originating from an irradiated nuclear fuels reprocessing installation or by a concentrated solution of plutonium containing americium, consists of placing this solution in contact with a crown compound, which makes it possible to obtain an extremely high plutonium decontamination percentage of the aqueous solution.

In fact, according to the invention, it has been found that the crown compounds have a high affinity for plutonium and are able to be used to complex traces of plutonium remaining in an aqueous solution and to extract them from an organic solvent and secure them to a solid phase.

The crown compounds able to be used in the method of the invention may be of various types, for example of the type of those described in the publication by E. WEBER and entitled "Crown compounds, properties and practice", p. 34–82. Thus, it is possible to use crown compounds satisfying the formulae (I) and (II)

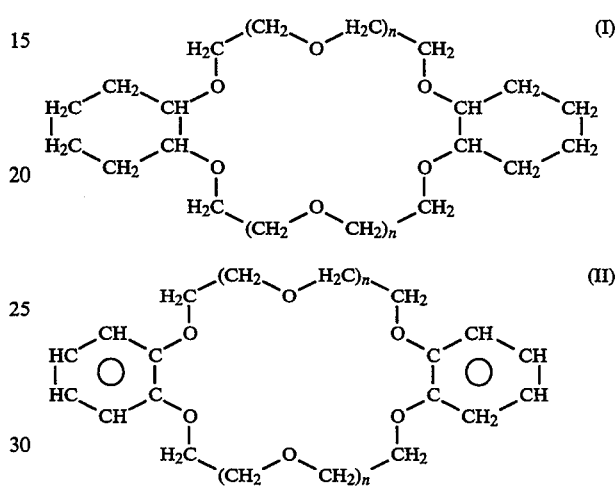

in which n is equal to 0 or is a whole number ranging from 1 to 4.

By way of example of such crown compounds, these may be those of formula (I) in which n is equal to 1 (DCH 18C6) or n is equal to 2 (DCH 24C8), and those of formula (II) in which n is equal to 1 (DB 18C6) and n is equal to 2.

It is also possible to use crown compounds satisfying the following formulae:

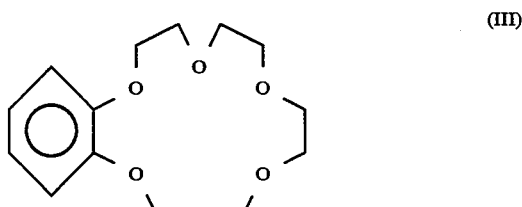

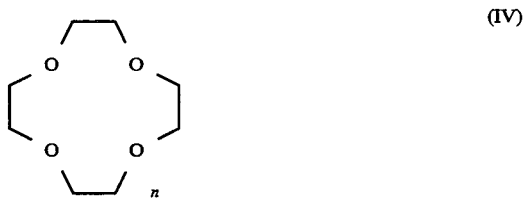

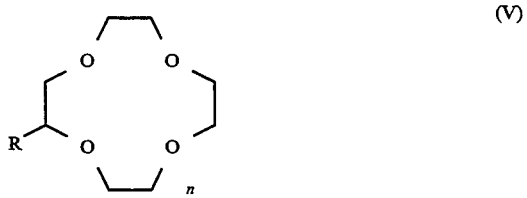

in which n is equal to 0, 1 or 2.

These crown compounds may be used in the form of isomer mixtures or in the form of pure isomers.

Preferably, when the crown compound satisfies the formula (I) in which n is equal to 1, the cis-syn-cis isomer is used in the case of solutions containing traces of plutonium, as it possesses a greater affinity for plutonium.

On the other hand, in the case of concentrated solutions of plutonium, it is preferable to use the cis-anti-cis isomer as the solubility of cis-anti-cis Pu-isomer complexes is much greater than that of cis-syn-cis Pu-isomer complexes.

In fact, by way of example, in the case of a cis-syn-cis isomer, the solubility of the complex is less than 4 g/l, whereas it is more than 30 g/l with the cis-anti-cis isomer when the DCH18C6 content is in both cases 0.268 mols/l.

Thus, when concentrated plutonium solutions are processed, such as plutonium solutions containing americium, it is possible to extract all the plutonium from an organic solution without any risk of precipitation.

Also, according to a first mode for implementing the method of the invention, which may be used also with both highly diluted solutions and with concentrated plutonium solutions, the aqueous solution containing the plutonium is placed in contact with an organic solution including at least one crown compound and the plutonium extracted from the organic solution is recovered by re-extraction from an aqueous solution.

Generally speaking, the organic solution used includes a diluting agent.

By way of example of diluting agents able to be used, these agents may be chlorinated solvents, such as $CHCl_3$, $CH_2Cl_2$, $CCl_3 CH_3$, $CHCl_2 CHCl_2$, $ClCH_2 CH_2Cl$ and dichlorobenzene, ether, hydrocarbons such as heptane, dodecane, benzene and alkylbenzenes, fatty alcohols, benzonitrile and nitrobenzene.

As a diluting agent, it is preferable to use benzonitrile, nitrobenzene or dichlorethane.

The crown compound concentration of the organic solution may vary within a wide range. It is selected according to the diluting agent used so as to selectively extract the maximum quantity of plutonium and to obtain a perfectly homogeneous organic solution in which there is no problem of crystallization of the crown compound or the crown compound/Pu complex.

Generally speaking, a crown compound concentration of the organic solution is used ranging from $10^{-3}$ to 2.5 mols/l.

So as to obtain a good separation of the plutonium from other metals present, it is however preferable to avoid using a very high crown compound concentration, as it has been observed with DCH18C6 that the extracted Pu/extracted fission products ratio increases when the DCH18C6 concentration reduced.

By way of example, with the cis-anti-cis isomer of DCH18C6, it is possible to use a crown compound concentration of 10% in weight/volume.

After extracting the plutonium from the organic solution, it is possible to recover this plutonium by re-extracting it from an aqueous solution, such as water or a solution containing a hydrophilic acid. The hydrophilic acid may be either sulphuric acid, hydrochloric acid, hydrofluoric acid or phosphoric acid.

It is preferable to use a sulphuric acid solution having a sulphuric acid concentration of from 0.5 to 2 mols/l.

Again, it is preferable to carry out the operation with an excess of sulphate ion with respect to the quantity of Pu to be re-extracted, for example an excess so that the ratio of the $SO_4^{-2}$ quantity to the Pu quantity is more than or equals 12. By way of example, it is possible to use an aqueous solution with 0.5 mols/l of $H_2SO_4$.

After re-extraction of the plutonium, it is possible to subject the organic solution obtained after this stage to a purification processing with a view to reusing it for the first plutonium extraction stage.

This processing may consist of washing by an aqueous solution of sulphuric acid having a $H_2SO_4$ concentration exceeding than of the one used in the Pu re-extraction stage, for example a solution with 3 mols/l of $H_2SO_4$.

Again, it is preferable in the first mode for embodying the method of the invention to carry out an additional stage for washing of the organic solution having extracted the plutonium by a nitric acid aqueous solution before executing the plutonium re-extraction stage.

This makes it possible to eliminate the fission products or the americium, which would subsequently have been extracted from the organic solution, and obtain at the end of the method a plutonium solution having a higher degree of purity.

For these washings, it is preferable to use nitric acid solutions having a nitric acid concentration of from 2 to 5 mols/l. In fact, a high concentration of $HNO_3$ favors the re-extraction of other metals, such as fission products. For example, it is possible to use a solution of 4.5N $HNO_3$.

Generally speaking, the initial aqueous solutions are nitric solutions and it is advantageous to adjust their nitric acid concentration to values of at least 4 mols/l so as to favor extraction of the plutonium from the organic solvent.

However, with concentrated solutions of plutonium containing americium, it is preferable to keep the nitric acid concentration of the solution at a value of between 2 and 4 mols/l so as to improve selectivity of extraction for the plutonium.

In addition, when the plutonium of the initial solution is not in the form of Pu(IV), a preliminary stage is carried out to oxidize the Pu(III) into Pu(IV) which may be effected with the aid of nitrous vapors, which correspond to the following reaction:

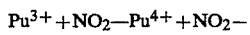

In this first mode for implementing the method of the invention, it is possible to carry out the placing in contact between the aqueous and organic solutions in conventional devices ensuring the mixture of the two phases and then their separation, for example in mixer-settlers and in co-flow or counter-flow exchange columns as pulsed columns.

So as to place the initial aqueous solution containing plutonium in contact with the organic solution containing the crown compound, the volume ratio is selected between the two solutions Vaq/Vorg where Vaq=volume of the aqueous solution
Vorg=volume of the organic solution
so as to obtain the best possible conditions for extraction of the plutonium.

When the crown compound is DCH18C6, it is preferable to use a high Vaq/Vorg ratio of more than 4, for example between 4 and 15, as the selectivity of the solvent for Pu increases with the value of this ratio.

However, the value of the ratio Vaq/Vorg selected depends also on the initial Pu concentration of the processed aqueous solution as the sites of the crown compound must not be saturated before the plutonium is retained by the crown compound.

So as to improve the extraction rate of the plutonium present in the aqueous solution, extraction may be effected over several stages by using, for example, a new organic solution in each stage. Thus, when an aqueous effluent containing Pu and fission products is processed in this way with a Vaq/Vorg ratio= 10 by using DCH18C6 with 2 mols/l in nitrobenzene, it is possible to extract 100% of the Pu by operating with 4 stages.

According to a second mode for implementing the method of the invention adapted to the processing of solutions containing traces of plutonium (IV), the crown compound is secured to a solid phase and this solid phase is placed in contact with the aqueous solution containing the traces of plutonium so as to retain the plutonium on this solid phase.

This second mode for implementing the method is extremely advantageous as this placing in contact may be effected by filtering the solution through this solid phase and thus retain the plutonium on this solid phase.

In this second mode for implementing the method, the crown compound may be secured to the solid phase by a chemical-linkage or by adsorption. The solid phase may be an organic or inorganic substance.

By way of example of inorganic substances, this substance may be silica, aluminium or other silicon-based substances, such as FLORISIL (magnesium silicate).

By way of example of organic substances, these substances may be polymers able to retain the crown compound, either by a chemical linkage or by adsorption.

In this second mode for implementing the method of the invention, it is next possible to recover the plutonium by placing the solid phase in contact with a solution of a hydrophilic acid such as $H_2 SO_4$, HCl, HF or $H_3 PO_4$, or with a solution of a reducing agent, for example a solution of hydroxylamine nitrate.

As mentioned earlier, the method of the invention may be used to recover traces of plutonium in concentrated solutions of fission products derived from the first cycle for processing irradiated nuclear fuels; it may also be used to recover traces of plutonium in aqueous effluents also containing americium and strontium. In this latter case, the americium and the strontium are extracted simultaneously.

BRIEF DESCRIPTION OF THE DRAWING

Other characteristics and advantages of the invention shall appear more readily from a reading of the following description, given by way of illustration and being in no way restrictive, with reference to the accompanying drawing which is a diagram representing an embodiment example of the first mode for implementing the method of the invention for the processing of a concentrated solution of fission products (PF).

DETAILED DESCRIPTION OF THE PREFERRED EMBODIMENTS

This FIGURE shows that the method of the invention includes a first stage for extracting the plutonium, two stages for washing and one stage for re-extracting this plutonium.

In the first stage for extraction of the plutonium, one volume of the concentrated solution of fission products AO is placed in contact with one volume of an organic solution O1 constituted by 25% (in weight/volume) of DCH 18C6 (isomer mixture) in benzonitrile.

After this stage for extraction of the plutonium, an aqueous solution A1 is obtained mainly containing the fission products and the organic solution O1 which contains almost all the plutonium present in the concentrated solution of fission products and also traces of uranium and fission products.

This solution O1 is successively washed twice by the 4N nitric acid, thus recovering one first aqueous solution A2 containing uranium and fission products and a second aqueous solution A3, again containing uranium and fission products.

After these two washing stages, the organic solution O1 is placed in contact with an aqueous solution of 1N sulphuric acid so as to re-extract the liquid phase plutonium. Thus, an aqueous plutonium solution A4 is obtained and an organic solution O1 freed of the plutonium which may be recycled for the first plutonium extraction stage.

EXAMPLE 1: Recovery of traces of plutonium present in a concentrated solution of fission products In this example, a concentrated solution of fission products polluted by traces of plutonium is processed as above and having the following composition:

$HNO_3$:4 mol−1
Pu:4.7 mg−1
Tc:321 mg−1
Ba:398 mg−1
Ru:1230 mg−1
U:1472 mg−1
Pd:12 mg−1
Rh:138 mg−1
Sr:270 mg−1
ΣPF:96910 mCi−1 by using for extraction a 25% (weight/volume) diluted solution of DCH18C6 in benzonitrile.

The compositions of the aqueous solutions A1, A2, A3 and A4 obtained in these conditions are given in the following table.

TABLE

| Solution | composition of aqueous solutions | | |
|---|---|---|---|
| | Pu | U | PF |
| A1 | 0 | 34.2% | 96% |
| A2 | 0 | 35.4% | 2.9% |
| A3 | 2% | 15.4% | 0.6% |
| A4 | 98% | 9% | 0.3% |

In the light of these results, it has been observed that after one extraction and two washings, an aqueous solution A4 is recovered containing 98% of the plutonium initially present in the concentrated solution of fission products AO. Moreover, the gamma activity of the aqueous solution A4 only represents 0.3% of the initial gamma activity. The method of the invention thus makes it possible to very easily recover almost all the plutonium contained in this type of solution.

EXAMPLE 2: Recovery of traces of plutonium contained in a concentrated solution of fission products In this example, a concentrated solution of fission products is processed containing:

-2.92 mg/l of $Pu^{4+}$
-167 Ci/l of fission products.

One volume of this solution is placed in contact with two volumes of a 5% (weight/volume) solution of DCH 18C6 (isomer mixture) in chloroform, then the organic solution is washed three times by the 5N nitric acid by using two nitric solution volumes for one organic solution volume. Next, the plutonium is re-extracted by water by using one organic solution volume for two volumes of water.

Thus in an aqueous solution, 41% of the initial plutonium is recovered and the fission product residual activity of this aqueous solution is only 4.6 mCi/l.

EXAMPLE 3: Processing of aqueous effluent containing traces of plutonium, americium and strontium In this example, an effluent having the following composition is processed:

| | |
|---|---|
| Cesium | $10^{-2}\ \mu g\ l^{-1}$ |
| Ruthenium | $4\ \mu g\ l^{-1}$ |
| Antimony | $1.10^{-1}\ \mu g\ l^{-1}$ |
| Strontium | $1.8.10^5\ B\ l^{-1}$ |
| Plutonium | $0.15\ \mu g\ l^{-1}$ |
| Americium | $2.10^3\ \mu g\ l^{-1}$ |

So as to extract the plutonium, this effluent is placed in contact with a 5% (weight/volume) organic solution of DCH 18C6 (isomer mixture) in chloroform and an aqueous effluent is recovered having the following composition after extraction:

| | |
|---|---|
| Cesium | $0.9.10^{-2}\ \mu g\ l^{-1}$ |
| Ruthenium | $4\ \mu g\ l^{-1}$ |
| Antimony | $2.10^{-1}\ \mu g\ l^{-1}$ |
| Strontium | $0.6.10^5\ Bl\text{-}1$ (33% of initial Sr) |
| Plutonium | $0.98\ \mu g\ l^{-1}$ (35% of initial Pu) |
| Americium | $0.8.10^3\ \mu g\ l^{-1}$ (38% of initial Am) |

These results show that with one single extraction, it is possible to reduce by almost ⅔rds the strontium, plutonium and americium contents of these aqueous effluents.

EXAMPLE 4: Processing of aqueous effluents containing Pu, Am and Cm

In this example, an aqueous effluent is processed having a nitric acid concentration of 0.7 mols/l and containing:
Pu:380 μg/l
Am:30 μg/l
Cm:0.7 μg/l.

One volume of this effluent is placed in contact with one volume of an organic solution containing 0.12 mols/l of the DCH 18C6 crown compound (isomer mixture) in chloroform. After separation of the solutions, the Pu, Am and Cm contents of the organic solution are determined. Thus, the following are extracted:
Pu:58% of the initial quantity
Am:49% of the initial quantity
Cm:69% of the initial quantity
namely 55% in all of the emitters (Pu+Am+Cm).

EXAMPLE 5: Separation of plutonium on a solid phase

In this example, a solid phase is used to which the crown compound is secured so as to eliminate the traces of plutonium from an aqueous effluent.

First of all, the crown compound DCH18C6 (isomer mixture) is secured to the solid phase by using a 5% (weight/volume) solution of DCH 18C6 in chloroform and by operating as follows.

5 ml of the DCH18C6 solution are made to pass into a column, diameter 1 cm and length 9 cm, filled with 2 g of FLORISIL (magnesium silicate). Next, $HNO_3$ with 4 mols/l is made to pass so as to eliminate the excess of DCH18C6 and place the column in equilibrium.

After securing the crown compound to the Florisil, 0.5 ml of the effluent to be decontaminated is made to circulate in the column, this effluent containing about 0.5 g/l of plutonium. Then the solid phase is washed by the 4N nitric acid. The plutonium content of the effluent leaving the column is 0.03 g/l.

Thus, 94% of the plutonium contained in the aqueous effluent is secured to the solid phase.

Then the plutonium is recovered by the reducing agent washing of the column by using a solution of hydroxylamine nitrate.

The following examples 6 to 8 illustrate the use of crown compounds to separate the plutonium from americium in concentrated aqueous plutonium solutions.

EXAMPLE 6: Purification of plutonium-concentrated aqueous solutions

In this example, this purification starts with an aqueous solution containing 10.5 g/l of Pu, 4.8 mg/l of Am and 4 mols/l of $HNO_3$, this solution of americium it contains being purified by extracting the plutonium from an organic solvent constituted by benzonitrile containing 10% (in weight/volume) of DCH18C6 (isomer mixture).

In this example, one extraction stage and one washing stage are effected in accordance with the same mode of operation as the one described on the annexed FIGURE. For extraction of the plutonium, one volume of the aqueous solution of plutonium and americium is placed in contact with one volume of the organic solvent for 10 minutes, then the phases are separated and, after this extraction, an aqueous solution A1 is recovered which includes 0.17% of the original plutonium and 69% of the original americium and an organic solvent containing more than 99% of the original plutonium and 31% of the original americium.

After this extraction, the solvent is washed by the 4N nitric acid by using one volume of the organic solvent for 5 volumes of the nitric acid and a contact time of 10 minutes. Thus, an aqueous solution A5 is recovered containing 0.5% of the original plutonium and 0.5% of the original americium.

The organic solvent contains therefore after washing more than 99% of the original plutonium and about 30% of the original americium.

The plutonium is re-extracted by washing with a solution containing a hydrophilic anion or by a reducing solution.

EXAMPLE 7

The same mode of operation as in example 6 is used to process the same solution of plutonium and americium, but by using instead of the isomer mixture DCH18C6, the cis-anti-cis isomer of DCH18C6 which has been prepared as follows:

24.6 g of commercial DCH18C6 containing 62.9% of the cis-syn-cis isomer (15.47 g), 37% of the cis-anti-cis isomer (9.1 g) and less than 1% of the other isomers of the DCH18C6 is dissolved in 74 ml of heptane and the cis-anti-cis isomer is recrystallized from this solution for 24 hrs at ambient temperature. Thus, 3.4 g of the crystallized cis-anti-cis isomer is recovered by filtering.

Then the solution is evaporated and 21.2 g of an isomer mixture is recovered, now having a cis-syn-cis isomer content of about 73%.

Then 850 ml of heptane and 108 ml of a solution of uranyl nitrate $(NO_3)_2UO_2, 6H_2O$ at 25% in weight is added to this mixture and all the above are agitated for 24 hrs at ambient temperature. Then the precipitate formed is filtered and dried in an oven at 60° C. for 20 hrs. Thus, 12 g of the precipitate are obtained which are dissolved in 300 ml of chloroform and 150 ml of distilled water. Then the organic phase is dried on $MgSO_4$, the solvent is filtered and evaporated under vacuum, which yields 5.6 g of the cis-anti-cis isomer, namely a yield of 98.9%, and the cis-syn-cis isomer is recovered from the filtration solvent by evaporating the solvent. Thus, 15.4 g of the cis-syn-cis isomer is obtained, namely a yield of 99.5%.

Then the prepared cis-anti-cis isomer is used at the rate of 10% (in weight/volume) in benzonitrile so as to extract the Pu, as in example 6.

In these conditions, the solution A1 contains 0.35% of the original plutonium and 63% of the original americium and the solution A2 contains 0.71% of the original plutonium and 0.9% of the original americium.

Thus, about 99% of the original plutonium and slightly more than 35% of the original americium is recovered from the organic solvent.

The cis-anti-cis isomer does not make it possible to obtain a plutonium extraction rate as high as in the case of the isomer mixture, but is more advantageous as the solubility of the Pu-DCH18C6 complex, which exceeds 30 g/l with the cis-anti-cis isomer, is much greater than with the isomer mixture where this solubility is less than 17 g/l.

Also, the use of the cis-anti-cis isomer is more advantageous in the case of concentrated solutions of plutonium as it is possible to extract all the plutonium from the organic solvent without the risk of precipitations occuring in the complex.

By way of comparison, the same separation is effected by using as a solvent a volume of 28% of tributylphosphate in dodecane instead of DCH18C6 in benzonitrile.

In these conditions, after washing, an organic solvent containing 80% of the original plutonium and 5% of americium is obtained.

Thus, the use of a crown compound makes it possible to significantly improve the plutonium recovery and extraction rate.

EXAMPLE 8

This example also illustrates the processing of an aqueous solution containing plutonium and americium.

In this example, the process starts with an aqueous solution containing:

| | |
|---|---|
| Pu | 30 g/l |
| Am | 9.5 mg/l |
| $HNO_3$ | 4 mols/l | and, as an organic solvent, the cis-anti-cis isomer of DCH18C6 is used with a 20% concentration (Weight/volume) in benzonitrile.

Extraction is effected in a battery comprising 3 storeys with a Vaq/Vorg ratio=3 by making the aqueous solution and this organic solvent circulate counter-flow and then of washing the organic solvent in a 2-storey battery by the 4N nitric acid circulating counter-flow with a Vaq/Vorg volume ratio equal to 1, and the washing solution is recycled into the extraction battery.

In these conditions, at the end of the operation, the following is obtained:
- an organic solvent containing
Pu:60 g/l
Am:7.4 µg/l
- an aqueous solution containing
Pu:0.02 mg/l
Am:6.28 mg/l

What is claimed is:

1. Method to recover traces of plutonium (IV) present in an aqueous solution consisting essentially of either a concentrated solution of fission products derived from the first cycle for reprocessing irradiated nuclear fuels, or an aqueous effluent derived from an irradiated nuclear fuel reprocessing installation, wherein the aqueous solution is placed in contact with a solid phase including at least one crown compound so as to retain the plutonium on the solid phase.

2. Method according to claim 1, wherein the solid phase is an organic or inorganic substance and wherein the crown compound is secured to this solid phase by means of a chemical linkage or by adsorption.

3. Method according to claim 2, wherein the solid phase is magnesium silicate.

4. Method according to any one of claims 1 to 3, wherein the plutonium is next recovered by placing the solid phase in contact with a solution of a reducing agent or of a hydrophilic acid.

5. Method according to claim 4, wherein the crown compound satisfies the formulae:

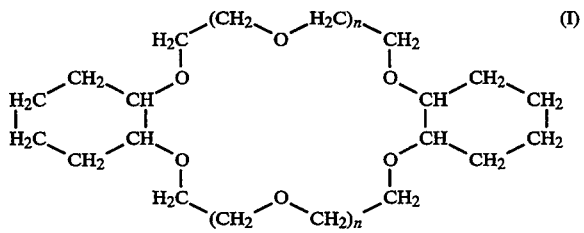

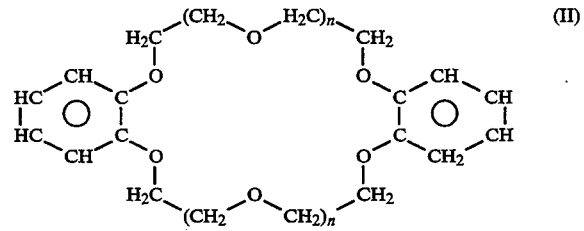

in which n=0 or is a whole number ranging from 1 to 4.

6. Method according to claim 5, wherein the crown compound satisfies the formula (I) with n=1.

7. Method according to claim 5, wherein the crown compound is the cis-syn-cis isomer of the crown compound of formula (I) in which n=1.

8. Method according to any one of claims 1, 2 and 3, wherein the crown compound satisfies the formula:

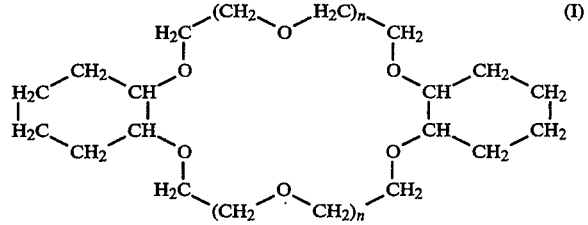
(I)
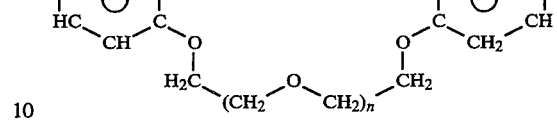
(II)
in which n=0 or is a whole number ranging from 1 to 4.
9. Method according to claim 8, wherein the crown compound satisfies the formula (I) with n=1.
10. Method according to claim 8, wherein the crown compound is the cis-syn-cis isomer of the crown compound of formula (I) in which n=1.
* * * * *